United States Patent
Nicodemus

(12) 
(10) Patent No.: US 6,655,254 B1
(45) Date of Patent: Dec. 2, 2003

(54) MULTIPLE AIRBORNE MISSILE LAUNCHER

(75) Inventor: Carl P. Nicodemus, Indianapolis, IN (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/903,961

(22) Filed: Jul. 11, 2001

(51) Int. Cl.[7] ............................. B64D 1/04; F41F 3/04; F41F 5/00
(52) U.S. Cl. ................... 89/1.54; 89/1.813; 89/1.814
(58) Field of Search ..................... 89/1.54, 1.813, 89/1.814

(56) References Cited

U.S. PATENT DOCUMENTS

| | | | | |
|---|---|---|---|---|
| 4,494,438 A | * | 1/1985 | Lighton et al. | 89/1.813 |
| 4,736,669 A | * | 4/1988 | Long et al. | 89/1.819 |
| 4,745,840 A | * | 5/1988 | Long | 89/1.814 |
| 4,829,878 A | * | 5/1989 | Thompson | 89/1.54 |
| 5,092,542 A | * | 3/1992 | Ellis et al. | 244/137.4 |
| 5,476,238 A | * | 12/1995 | Parker | 244/137.4 |
| 5,932,829 A | * | 8/1999 | Jakubowski, Jr. | 89/1.54 |
| 6,250,195 B1 | * | 6/2001 | Mendoza et al. | 89/1.59 |

OTHER PUBLICATIONS

LAU–117 Maverick Luancher, Apr. 23, 2000, www.fas.org/man/dod–101/sys/ac/equip/lau–117.htm, accessed Aug. 30, 2002.*

BRU–32/A and BRU–33 A/A Bomb Ejector Rack, Jan. 9, 1999, www.fas.org/man/dod–101/sys/ac/equip/bru–32.htm, accessed Aug. 30, 2002.*

BRU–55/A and BRU–57/A Multiple Carriage "Smart" Bomb Rack, Jan. 9, 1999, www.fas.org/man/dod–101/sys/ac/equip/bru–57.htm, accessed Aug. 30, 2002.*

F–15 Eagle, Jun. 10, 2000, www.fas.org/man/dod–101/sys/ac/f–15.htm, accessed Mar. 24, 2003.*

* cited by examiner

Primary Examiner—Charles T. Jordan
Assistant Examiner—H. A. Blackner
(74) Attorney, Agent, or Firm—William C. Schubert; Glenn H. Lenzen, Jr.

(57) ABSTRACT

A lightweight multiple missile launch assembly (10) adapted to carry newer heavier Maverick missiles (AGM-65D, E, F, G or K). The invention is illustrated with a BRU-33, 55 or 57 bomb rack (12) adapted to carry two LAU-117 missile launchers (24, 26). The missile launchers (24, 26) are secured to the bomb rack (12) with a suspension unit (20, 22) of unique and novel design. The suspension units (20, 22) allow for releasable engagement of the missile launchers (24, 26). This allows for different missile packages to be deployed in the field.

16 Claims, 3 Drawing Sheets

MULTIPLE AIRBORNE MISSILE LAUNCHER

BACKGROUND OF THE INVENTION

1. Field of the Invention

The present invention relates to missile systems. More specifically, the present invention relates to apparatus for launching a missile from an airborne platform.

2. Description of the Related Art

The Maverick missile is well-known in the art as are launchers for same. As used herein, the following Government designations LAU, AGM and BRU are believed to mean 'Launcher Aircraft Unit', 'Air-to-Ground Missile' and 'Bomb Rack Unit', respectively. The LAU-88 launcher is being used to carry the conventional Maverick missile (AGM A-D). Although the LAU-88 features the capability to carry three missiles, it is heavy, has a high drag coefficient, is not authorized to carry the new and heavy Blast penetrator warhead (AGM-65E, F, G or K), and requires the AGM-65D infrared (IR) missile to be rotated. In addition, the LAU-88 suspends the Maverick missiles is both the horizontal and vertical plane which requires the use of peculiar loading equipment and makes loading difficult.

Many of these shortcomings are addressed by the LAU-117 launcher, however, the LAU-117 launcher is capable of carrying only one missile at a time.

Accordingly, a need remains in the art for a launcher capable of carrying more than one of all versions of the Maverick missile (including (AGM-65D, F, G, or K)), which minimizes weight, aerodynamic drag, and simplifies loading procedures.

SUMMARY OF THE INVENTION

The need in the art is addressed by the system and method of the present invention. In accordance with the present teachings, a bomb rack is adapted to carry a missile launcher.

In the illustrative embodiment, a BRU-33, 55 or 57 is adapted to carry two LAU-117 missile launchers. However, other missile launcher/missile combinations may be used as well. The missile launchers are secured to the bomb rack with a suspension unit of unique and novel design. This new multiple missile launcher configuration allows for releasable engagement of the missile launchers in the vertical plane. This allows for different missile packages to be deployed in the field.

Hence, the need in the art is addressed by the provision of a lightweight multiple missile launch assembly adapted to carry two LAU-117 launchers and all versions of the Maverick missiles (including AGM-65D, E, F, G or K) with improved aerodynamic properties and simplified missile loading procedures.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
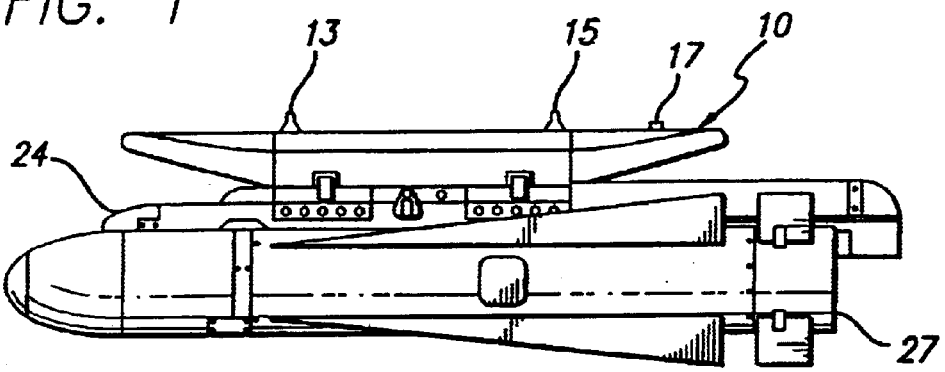
FIG. 1 is a side view showing the multiple missile launcher of the present invention loaded with LAU-117 missile launchers with missiles.
Figure 2:
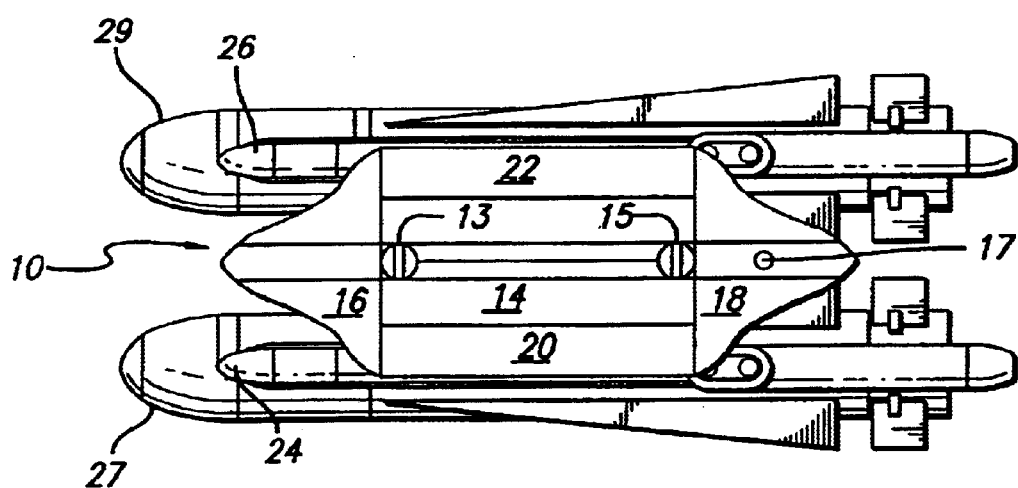
FIG. 2 is a top view showing the multiple missile launcher of the present invention loaded with LAU-117 missile launchers and missiles.
Figure 3:
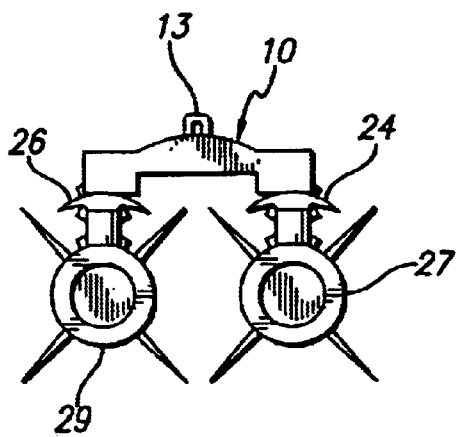
FIG. 3 is a front view showing the multiple missile launcher of the present invention loaded with LAU-117 missile launchers and missiles.

FIG. 1 is a side view, FIG. 2 is a top view and FIG. 3 is a front view showing the multiple missile launcher of the present invention loaded with two LAU-117 launchers and missiles. As shown in FIGS. 1–3, in the illustrative embodiment, the multiple missile launcher 10 of the present invention is adapted to carry first and second LAU-117 missile launchers 24 and 26 with missiles 27 and 29. A novel feature of the invention is the capability to carry more than one of the newer Maverick air-to-ground missiles (i.e., AGM-65D, E, F, G or K) simultaneously. Nonetheless, the launcher 10 of the present invention may carry other missile launcher with missiles and dissimlar missile launcher and missile combinations. The launcher 10 of the present invention is shown more clearly in FIG. 4.

Figure 4:
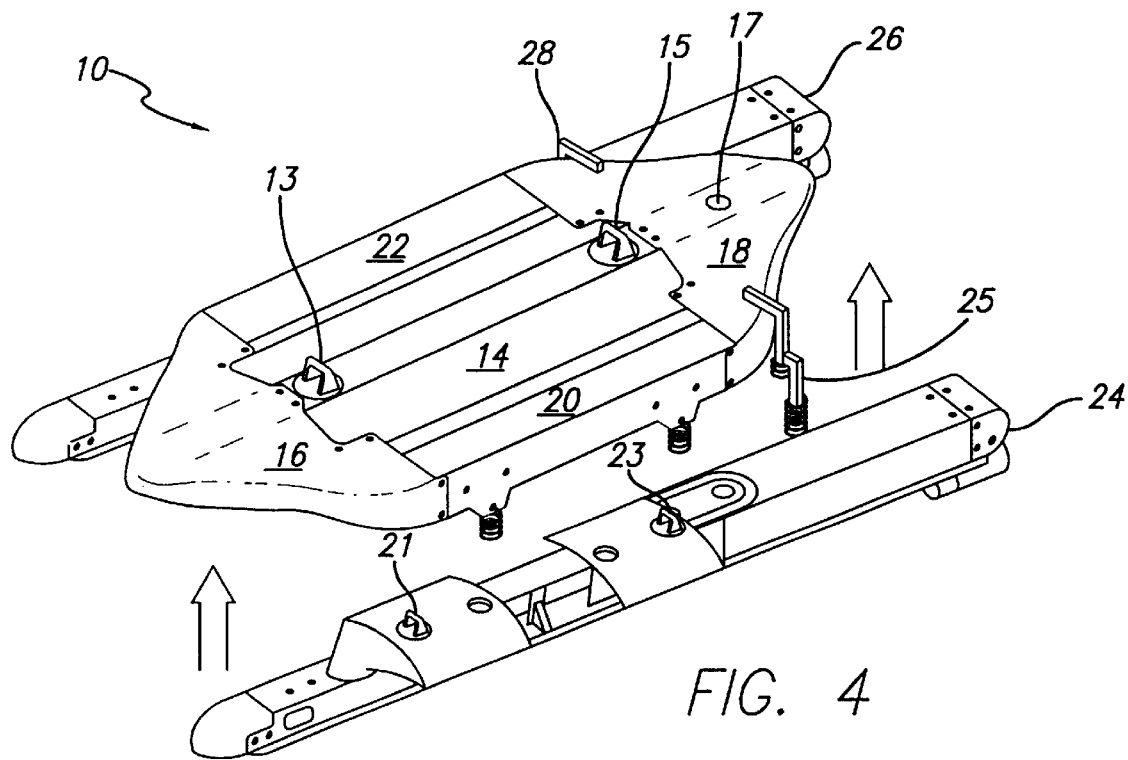
FIG. 4 is a perspective view of an illustrative embodiment of a multiple missile launcher implemented in accordance with the teachings of the present invention with LAU-117 missile launchers. The arrows illustrate vertical loading of the LAU-117 launcher onto the multiple missile launcher.

FIG. 4 is an exploded view of an illustrative embodiment of a multiple missile launcher and two LAU-117 launchers implemented in accordance with the teachings of the present invention. In the illustrative embodiment, the multiple missile launcher is constructed by modifying a conventional BRU 33, 55 or 57 bomb rack to carry a LAU-117 missile launcher. However, those of ordinary skill in the art will appreciate that other designs may be employed to carry the other launcher and missile combinations without departing from the scope of the present teachings.

Figure 5:
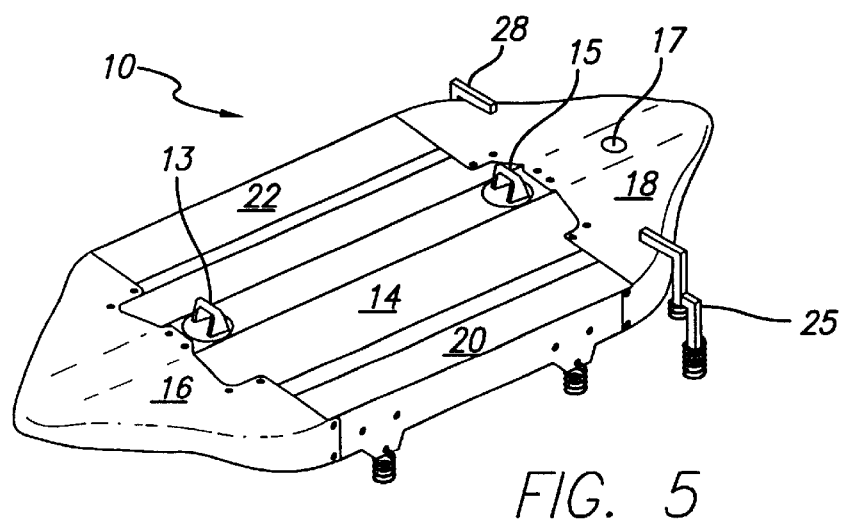
FIG. 5 is a perspective view of an illustrative embodiment of the multiple missile launcher implemented in accordance with the teachings of the present invention.
Figure 6:
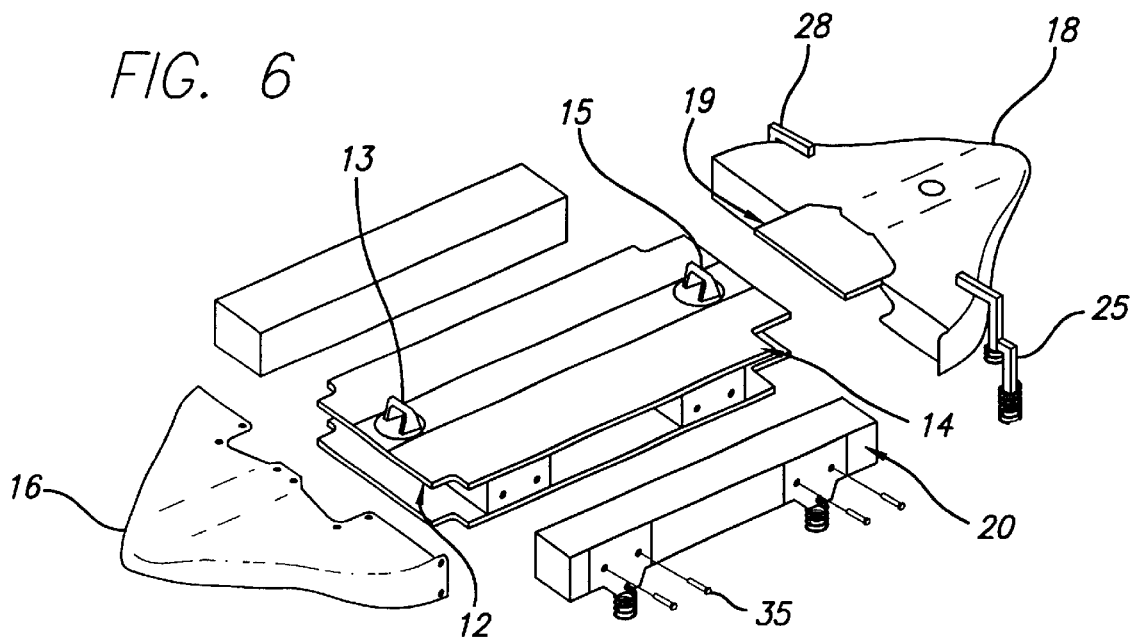
FIG. 6 is a disassembled perspective view of the illustrative embodiment of the of the multiple missile launcher implemented in accordance with the teachings of the present invention.

FIG. 5 is a perspective view of an illustrative embodiment of the multiple missile launcher implemented in accordance with the teachings of the present invention. FIG. 6 is a disassembled perspective view of the illustrative embodiment of the multiple missile launcher implemented in accordance with the teachings of the present invention. As shown in FIGS. 5 and 6, the multiple missile launcher has a strong back 14, two lower covers 12, two lugs 13, 15, and associated hardware. The strong back 14 is made of aluminum or other suitable material. The strong back is the primary structural member which provides a mounting for the release units on either side, provides appropriate spacing for carriage of two missile launchers and missiles, and lugs 13 and 15 for mounting the launcher 10 to the undercarriage of an aircraft. The launcher 10 further includes a forward nose cone 16 and an aft nose cone 18. An electronics unit 19 is disposed within the aft nose cone 18 and/or the forward nose cone 16. In a BRU-55 or 57 implementation, a second electronics unit (not shown) may be stored in the forward nose cone 16. In accordance with the present teachings, the electronics unit 19 is designed to provide an electrical interface between a single electrical interface at the aircraft pylon and two LAU-117 electrical interfaces to allow the host aircraft to carry and launch two missiles from a single aircraft pylon. The aircraft pylon (not shown) is electrically connected to the electronics unit 19 via a connector 17 on the aft nose cone 18. First and second electrical harnesses 25 and 28 are provided to communicate electrical signals from the electronics unit 19 to each of the missiles 27 and 29 (FIG. 1).

Affixed to the strong back 14 between the forward and aft nose cones 16 and 18 are first and second suspension units 20 and 22 designed in accordance with the present teachings. Each suspension unit 20, 22 is mounted on the lower cover 12 with a number (e.g. 6) attachment bolts 35. In the illustrative embodiment, each suspension unit 20 or 22 is designed to provide carriage and release of a missile launcher (e.g., an LAU-117 launcher) 24 or 26 by the launcher 10.

Figure 7:
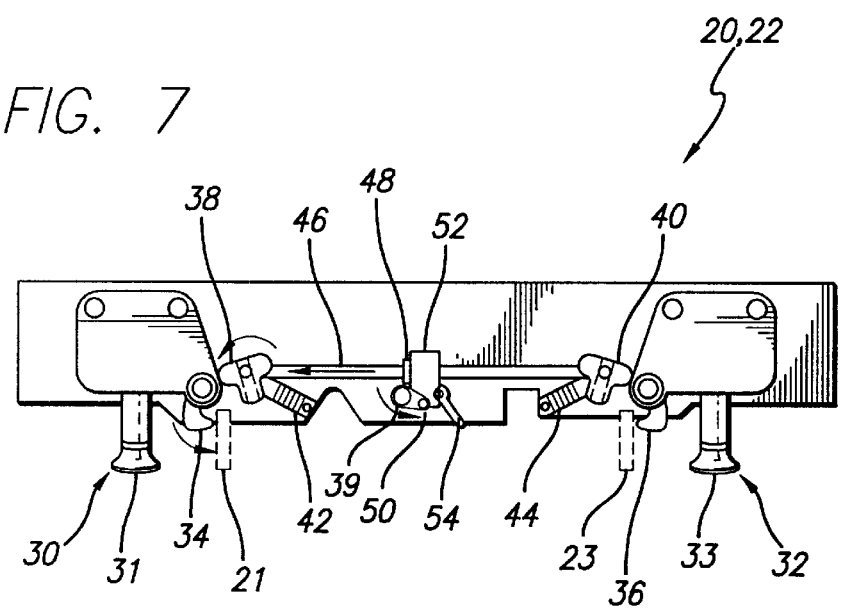
FIG. 7 is a side view of a suspension unit of the support assembly utilized in the illustrative embodiment of a multiple missile launcher implemented in accordance with the teachings of the present invention.

FIG. 7 is a side view of a suspension unit of the support assembly utilized in the illustrative embodiment of a multiple missile launcher implemented in accordance with the teachings of the present invention The suspension unit interfaces with the lugs 21 and 23 and support fittings of the launchers 24 and 26 (FIG. 1). As shown in FIG. 7, the suspension units 20 and 22 include forward and aft swaybrace assemblies 30 and 32, respectively, two suspension hooks 34 and 36, and linkages and associated hardware to allow carriage and release of the missile launchers. The mechanical operation of the suspension units encompasses 3 major conditions: Store loaded, manual release and ground safety lock.

Store Loaded Condition

As the LAU-117 launcher 24 is loaded, the top of LAU-117 lug 21, 23 (shown in phantom) pushes up on the suspension hooks 34 and 36, rotating the suspension hook toward the closed position. As the suspension hooks 34 and 36 rotate, cam followers (not shown) slide in the cam tracks (not shown) until the hook self-closing position (over center position) is reached. As the hook latch cam 38 or 40 is rotated past the over center position, the hook latch spring 42 or 44 provides the torque that rotates the suspension hooks 34 or 36 to the closed position. As the hook latch cam 38 or 40 is being rotated toward the closed position, the hook release rod 46 is being pulled, rotating the hook release lever 48. Hook release lever rotation moves the hook release sleeves 50 upward, sliding on the hook release guide 52. With the suspension hooks 34 and 36 closed, the safety selector handle 54 can be rotated to the locked position. After the LAU-117 is loaded, the swaybrace screws 31 and 33 are tightened and secured with a jam nut (not shown) to prevent movement of the LAU-117 during flight.

Manual Release

Manual release provisions are provided for opening the suspension hooks by maintenance/loading personnel. When the manual release shaft 39 is turned, the hook release lever 48 is pulled by the manual release rotating the hook latch cam 38. When the hook release lever 48 is turned, it pulls the hook release sleeves 50 down, which are free to slide on the hook release guide 52. As the hook latch cam 38 is rotated by the hook release rod 46, cam followers (not shown) slide in the cam tracks (not shown) until the hook self-opening point (over center position) is reached. The hook latch spring 42 is compressed during hook latch cam rotation. Suspension hooks 34, 36 opening past the over center position is accomplished by continued turning on the manual release shaft 39, tension of the compressed hook latch spring 42, and (if installed) weight of the stores on the suspension hooks 34 and 36.

Ground Safety Lock

A ground safety lock is provided to prevent inadvertent release of the stores from the suspension unit. When the safety selector handle 54 is in the locked position, the safety rod prevents downward movement of the hook manual release guide 52. The safety selector handle 54 provides a visual indication as to whether or not the suspension unit 20 is locked. Returning to FIGS. 1–3, the Maverick missiles, 27 and 29 are typically pre-loaded onto the LAU-117 launchers. The multiple missile launcher, 10, is fitted to the aircraft (not shown). Then the LAU-117 launchers with preloaded missiles are loaded onto the multiple missile launcher.

Thus, a multiple missile launcher is provided that doubles the loadout of AGM-65E, F, G and K Maverick and other missiles. No rotation joint is required and the invention is adapted to launch the entire Maverick missile family. The invention offers reduced weight and simplified loading procedures relative to the conventional solution. The loadout may be mixed and matched as per a variety of mission profiles.

The present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A missile launcher comprising:

a bomb rack, a missile launcher, and at least one suspension unit attached to said bomb rack, said suspension unit being adapted to couple the launcher to said bomb rack.

2. The invention of claim 1 wherein said suspension unit includes means for releasably engaging said first missile launcher.

3. The invention of claim 1 further including a second suspension unit attached to said bomb rack, said second suspension unit being adapted to couple a second missile launcher to said bomb rack.

4. The invention of claim 3 wherein at least one of said missile launchers is a LAU-117 missile launcher.

5. The invention of claim 1 wherein the bomb rack is a BRU-33 bomb rack.

6. The invention of claim 1 wherein the bomb rack is a BRU-55 bomb rack.

7. The invention of claim 1 wherein said first missile launcher is a LAU-117 missile launcher.

8. A multiple missile launcher comprising:

a bomb rack;

first and second missile launchers; and first and second suspension units for coupling said first and said second missile launchers to said bomb rack.

9. The invention of claim 8 wherein each suspension unit includes means for releasably engaging said first or said second missile launcher.

10. The invention of claim 8 wherein at least one of said missile launchers is a LAU-117 missile launcher.

11. The invention of claim 8 wherein the bomb rack is a is BRU-33 bomb rack.

12. The invention of claim 8 wherein the bomb rack is a BRU-55 bomb rack.

13. A missile launcher comprising:
a bomb rack;
a first missile launcher,
a first suspension unit attached to said bomb rack, said suspension unit being adapted to couple the first missile launcher to said bomb rack;
a second missile launcher, and
a second suspension unit attached to said bomb rack, said second suspension unit being adjusted to couple the second missile launcher to said bomb rack.

14. The invention of claim 13 wherein at least one of said missile launchers is a LAU-117 missile launcher.

15. The invention of claim 3 wherein said first and second missile launchers are dissimilar.

16. The invention of claim 8 wherein said first and second missile launchers are dissimilar.

\* \* \* \* \*